United States Patent
Akkermann et al.

(10) Patent No.: US 8,136,768 B2
(45) Date of Patent: Mar. 20, 2012

(54) SYSTEM AND METHOD FOR ADJUSTING CONTROL SURFACES FOR WIND TUNNEL MODELS

(75) Inventors: Eldert Akkermann, Bremen (DE); Martin Wahlich, Bremen (DE)

(73) Assignee: Airbus Operations GmbH (DE)

( * ) Notice: Subject to any disclaimer, the term of this patent is extended or adjusted under 35 U.S.C. 154(b) by 572 days.

(21) Appl. No.: 12/319,470

(22) Filed: Jan. 7, 2009

(65) Prior Publication Data
US 2009/0179109 A1 Jul. 16, 2009

Related U.S. Application Data

(60) Provisional application No. 61/010,382, filed on Jan. 8, 2008.

(30) Foreign Application Priority Data

Jan. 8, 2008 (DE) .................. 10 2008 003 543

(51) Int. Cl.
*B64C 3/58* (2006.01)
(52) U.S. Cl. ..................................... 244/213
(58) Field of Classification Search .......... 244/213, 244/214, 211, 212, 215
See application file for complete search history.

(56) References Cited

U.S. PATENT DOCUMENTS

| | | | | |
|---|---|---|---|---|
| 3,986,689 | A | * | 10/1976 | Maltby .................. 244/213 |
| 4,262,868 | A | * | 4/1981 | Dean ..................... 244/214 |
| 4,441,675 | A | * | 4/1984 | Boehringer et al. ..... 244/213 |
| 4,763,862 | A | * | 8/1988 | Steinhauer et al. ...... 244/215 |
| 7,048,234 | B2 | * | 5/2006 | Recksiek et al. ........ 244/213 |
| 7,293,744 | B2 | * | 11/2007 | Perez-Sanchez et al. . 244/211 |
| 7,766,282 | B2 | * | 8/2010 | Kordel et al. ........... 244/215 |

FOREIGN PATENT DOCUMENTS

| | | |
|---|---|---|
| DE | 3151025 | 7/1983 |
| JP | 7035640 | 2/1995 |
| JP | 8054316 | 2/1996 |

* cited by examiner

*Primary Examiner* — Tien Dinh
*Assistant Examiner* — Keith L Dixon
(74) *Attorney, Agent, or Firm* — Lerner, David, Littenberg, Krumholz & Mentlik, LLP

(57) ABSTRACT

A system and a method for adjusting and locking a control surface that is movably arranged on a wind-tunnel aircraft model and comprises a drive arrangement for driving the control surface, and a locking arrangement. The drive arrangement comprises a first drive motor, arranged in a fixed manner relative to the control surface, at least one first connecting rod eccentrically connectable to the first drive motor, and at least one lever, whose one end can be held on the first connecting rod and whose other end can be held on a fixed point of the aircraft model. The locking arrangement can be attached in a fixed manner relative to the control surface and is further designed to block a relative movement between the control surface and the aircraft model.

15 Claims, 4 Drawing Sheets

SYSTEM AND METHOD FOR ADJUSTING CONTROL SURFACES FOR WIND TUNNEL MODELS

CROSS-REFERENCE TO RELATED APPLICATIONS

This application claims the benefit of the filing date of U.S. Provisional Patent Application No. 60/010,382 filed Jan. 8, 2008, the disclosure of which is hereby incorporated herein by reference.

BACKGROUND OF THE INVENTION

The invention relates to a system for adjusting and locking a control surface that is movably arranged on a wind-tunnel aircraft model.

Usually the control surfaces of a wind-tunnel aircraft model are deflected by way of prefabricated fixed fittings. These fittings are produced separately for various control surface angles and need to be integrated in the model or exchanged in the wind tunnel by mechanics.

This concept is associated with a disadvantage in that for each position of a relevant control surface an individual fitting has to be produced and correspondingly held at the ready. This further results in a lack of flexibility when experimenting with wind tunnel models, because no alterations of control surface positions are possible during ongoing operation. Moreover it is necessary for a person to gain access to the wind tunnel, or to remove the model from the wind tunnel, in order to arrange new control surface positions by means of a refit.

BRIEF SUMMARY OF THE INVENTION

According to an exemplary embodiment of the present invention a system for adjusting and locking a control surface, according to claim 1, which control surface is movably arranged on a wind-tunnel aircraft model is provided. Advantageous improvements of the system are stated in the subclaims.

This may provide for a modular and remotely-controllable drive system, which may be used in the most versatile manner possible, for control surfaces of a wind-tunnel aircraft model, which drive system requires modest adjustment expenditure for integration into various control surfaces of the aircraft model, and which drive system provides adjustment of a control surface angle to a predetermined value and provides locking at that position.

The system according to the invention provides an advantage in that a drive unit for driving the control surface and in that a locking unit may be attached in a fixed manner on or in the control surface to be driven. This means that a control surface that may be equipped according to the system according to the invention in itself comprises all the elements for driving the control surface so that it is only necessary to affix the control surface to the model and to make it fully operative by way of corresponding easy-to-route electrical supply cables for remote-control operation. The system according to the invention essentially comprises a drive unit for driving the control surface as well as comprising a locking unit. The locking unit comprises a drive motor which by means of a connecting rod allows one end of a lever that is movably held to this connecting rod to rotate, wherein the other end of the lever is held to an immovable part of the aircraft model so as to be fixed. Accordingly, a four-link chain is created by the movable bearing arrangement of the control surface, the rotation of the connecting rod relative to the control surface, and between the connecting rod and an immovable part of the model, by means of which four-link chain a deflection of the control surface is enforced when the connecting rod is rotated.

In an advantageous improvement the drive motor is arranged within the hinge axis of the control surface, and its shaft rotation is, by way of a pair of toothed wheels, to a connecting rod that is distanced from the hinge axis and that is situated further within the control surface, which connecting rod is supported, by way of a lever, on a point arranged in a fixed manner on the model, and in particular on a second connecting rod that is identical in designed but that is arranged so as to be immovable.

In order to lock the control surface relative to the model, according to the subclaims a mechanical locking device may be used, which is based on the interaction of positively locking means, in particular of corresponding toothed surfaces. Thus, the locking device may comprise a block that is arranged on the model and that is, for example, designed in the shape of an arc of a circle and that comprises teeth, with which block a corresponding counterpart arranged on the control surface may be made to enmesh when a predetermined control surface angle has been reached. As a result of the positive lock the movement of the control surface relative to the immovably arranged block is locked. In this arrangement the angle of the control surface may be determined by means of an inclinometer.

According to an exemplary embodiment of the present invention a method, the use of the system according to the invention, an aircraft model and an aircraft are provided.

BRIEF DESCRIPTION OF THE DRAWINGS

Below, the invention is explained in more detail with reference to the figures. Similar objects in the figures are designated with the use of similar reference characters. The following are shown.

DETAILED DESCRIPTION

Figure 1:
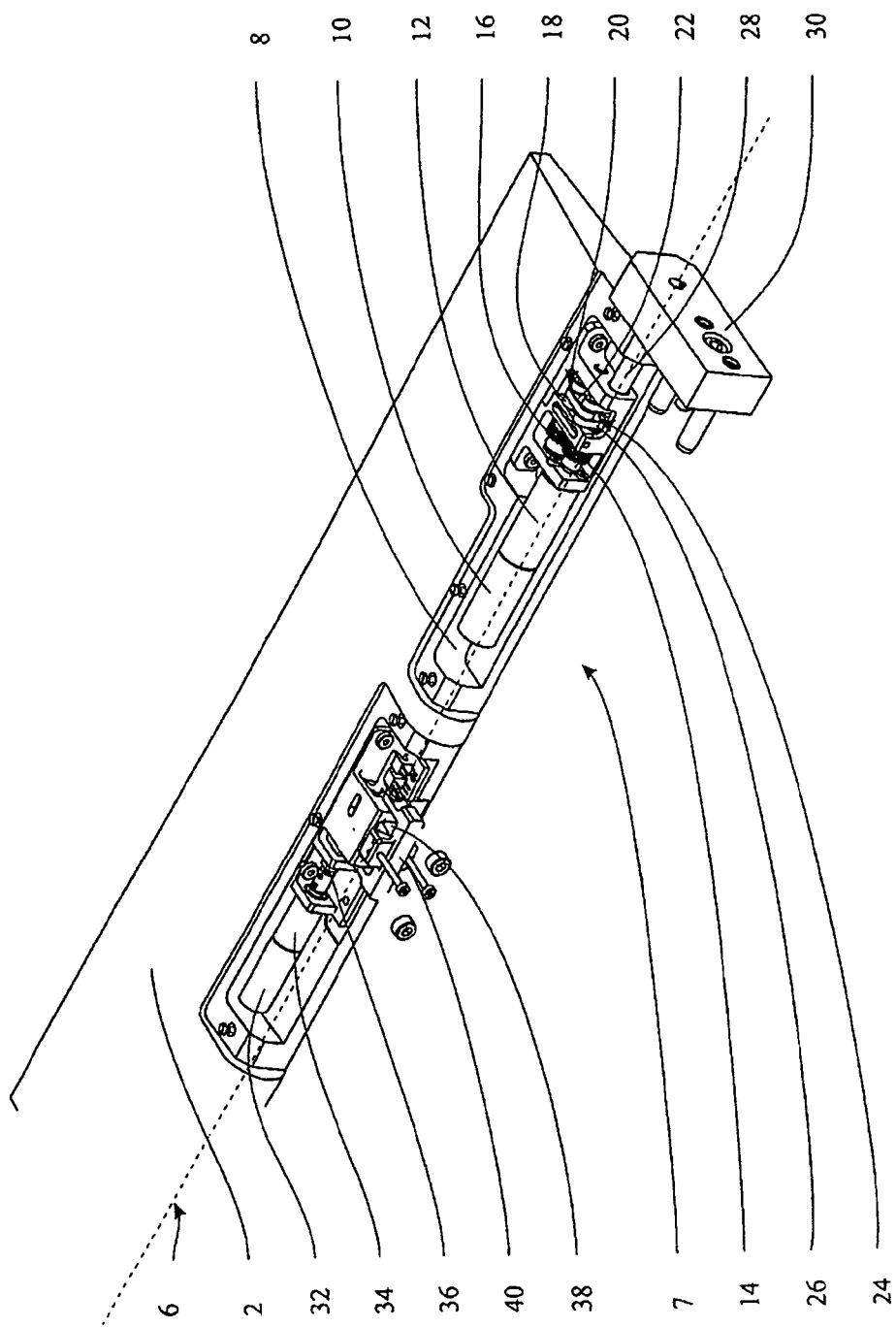
FIG. 1: a three-dimensional view of the exemplary embodiment of the system according to the invention.

FIG. 1 shows the system according to the invention with reference to an exemplary embodiment of an aileron drive. Thus the system according to the invention is integrated in an aileron 2 that is movably arranged on a wing 4 and that may be deflected, relative to a hinge axis 6, by an angle either upwards or downwards.

In a recess 8 of the control surface 2 a drive arrangement 7 situated in the aileron 2 comprises a motor 10 that leads to a separate gear mechanism 12 that drives a first toothed wheel 14. A second toothed wheel 16 meshes with the first toothed wheel 14, with the second toothed wheel 16 again being eccentrically connected to a pair of first connecting rods 18. Accordingly, the first connecting rods 18 rotate in the opposite direction to the first toothed wheel 14 and in so doing move one end 20 of a lever 22. The end 24 of the lever 22, which end 24 is opposite the first end 20, is movably held in a pair of second connecting rods 26 that are rigidly connected to a driven shaft 28, wherein the driven shaft 28 in turn is immovably connected to a support block 30 that is arranged in a fixed manner on the wing. As a result of the immovable arrangement of the driven shaft 28 on the support block 30 the shaft 28 cannot rotate so that the second connecting rods 26 are designed correspondingly so as to be arranged in a fixed manner on the wing or on the model.

Figure 2:
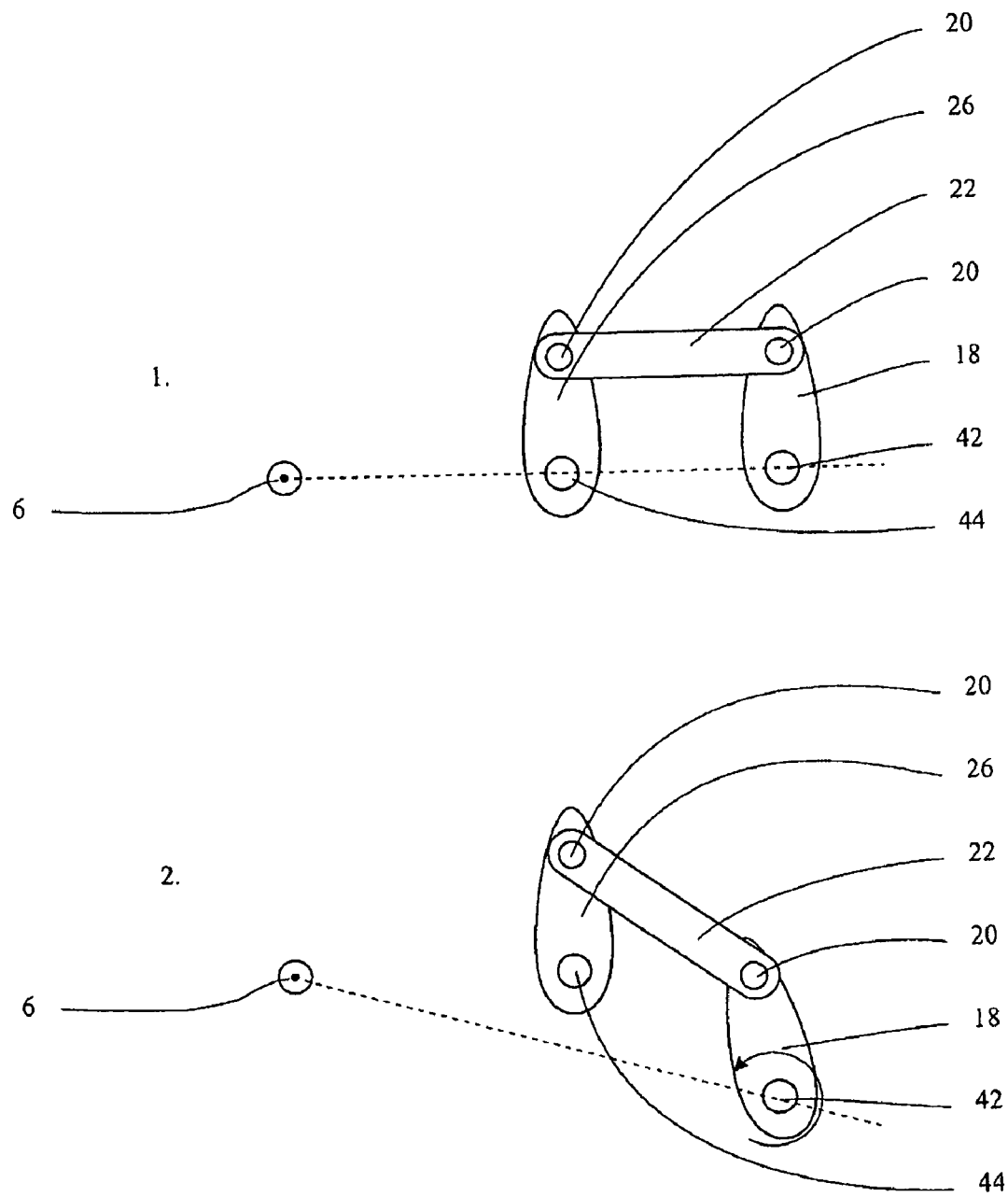
FIG. 2: a simplified diagrammatic view of the connecting rod/lever arrangement of the drive unit of the exemplary embodiment.

If the pair of toothed wheels comprising toothed wheels 14 and 16 are driven by the drive motor 10, rotation of the first end 20 of the lever 22, on the rotary axis of the toothed wheel 16, is caused. Due to the arrangement of the motor-driven first connecting rods 18 in the movably held control surface 2 and the connection of the lever 22 between the first connecting rods 18 and a point arranged in a fixed manner on the wing, a four-link chain with one degree of freedom is created. Accordingly, the aileron 2 has to assume a position that corresponds to the respective position of the connecting rod 18. FIG. 2 shows a simplified view of the lever/connecting rod combination.

If the motor 10 were to continuously rotate in one direction, the pair of first connecting rods 18 would also continuously rotate so that continuously an alternating hinging movement of the control surface 2 upwards and downwards would result. In this arrangement it is advantageous if there are no hard delimitation areas for delimitation of the movement of the aileron 2, which hard delimitation areas during frequent use might lead to unnecessary material loads.

If in the proposed drive arrangement 7 a predetermined angle of the aileron 2 is achieved, which may, for example, be detected by a suitable electronic inclinometer, the drive of the aileron 2 needs to be stopped, and the aileron 2 needs to be kept in the position reached. This is effected by a locking arrangement 31 that is designed so as to be separate from the drive arrangement 7.

Figure 3:
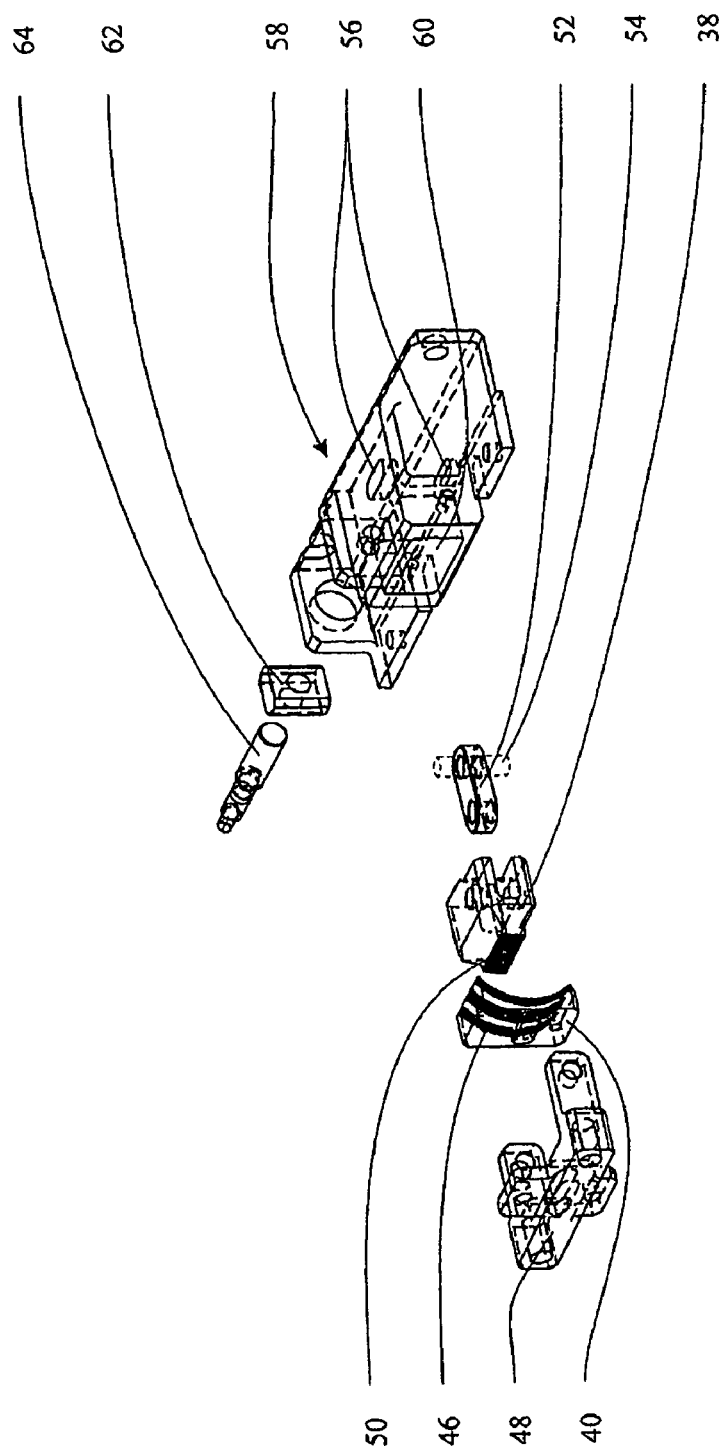
FIG. 3: a detailed three-dimensional view of the locking mechanism.

The locking arrangement 31 also comprises a drive motor 32 that leads to a gear mechanism unit 34. In this way a spindle 36 is driven, which by way of a spindle nut (not shown in the drawing) and a lever (also not shown in the drawing) may push a body 38, whose surface is toothed, into the tooth arrangement of a corresponding toothed block 40, wherein the toothed block 40 is arranged in a fixed manner on the wing. If the toothed body 38 engages the toothed block 40, any rotation of the aileron 2 on its hinge axis 6 is prevented. FIG. 3 shows a more detailed view of the locking arrangement 31.

FIG. 2 diagrammatically shows the interaction between the first connecting rods 18 and the second connecting rods 26 as well as of the lever 22. At commencement of movement (uppermost diagram under 1.) the two connecting rod pairs 18 and 26 are aligned so as to be parallel to each other, and the lever 22 is in an essentially horizontal position. The connecting line between the hinge axis 6 of a lower bearing hole 42 of a first connecting rod 18 that is arranged in a fixed manner on the aileron represents the alignment of the aileron 2 relative to the wing 4. In a particular design case the position of the hinge axis 6 on a second connecting rod 26 that is arranged in a fixed manner on the model coincides with the position of a lower bearing hole 44 so that the connecting line of the two lower bearing holes 42 and 44 represents the deflection of the aileron 2. In the case shown the aileron 2 is aligned horizontally because the two bearing holes 42 and 44 are at the same height. If the first connecting rod 18 is rotated by the motor 10, the lever 22 is pushed in the direction of the second connecting rod 26. Since the second connecting rod 26 is arranged in a fixed manner relative to the wing 4, as a reaction to this pressure force the bearing hole 42 has to assume another position so as to prevent jamming of the arrangement.

Accordingly, the bearing hole 42 moves anticlockwise downwards during the initial rotation, as shown in 2. When a point is reached at which the lever 22 is aligned parallel to the first connecting rod 18, the maximum downwards deflection of the aileron 2 is attained. During further anticlockwise rotation of the connecting rod 18, the aileron 2 hinges back towards horizontal, and during further rotation it hinges upwards. Depending on the design of the connecting rods 18, of the lever 22 and of the connecting rod 26, with this arrangement any deflection of the aileron 2 may be attained without there being a need for separate delimitation surfaces or the like.

FIG. 3 finally shows a detailed view of the locking device that makes it possible to lock the aileron 2 relative to the wing 4. The toothed block 40, which at its surface 46 facing the aileron 2 comprises a tooth arrangement, is arranged on the wing 4 by means of a holder 48. The toothed body 38, whose surface 50 pointing towards the wing 4 also comprises a tooth arrangement, is movably connected to a lever 52. At the end of the lever 52, which end is opposite the toothed body 38, a guide pin 54 may be inserted in the lever 52, which guide pin 54 may be guided along a direction that is parallel to the direction of the tooth arrangement of the body 38 by means of two elongated holes 56 of a housing 58. If the guide pin 54 is displaced within the elongated holes 56, a deflection of the toothed body 38 within a guide opening 60 into the housing 58 or out of the housing 58 takes place. As a result of this deflection, meshing of the tooth arrangement of the body 38 with the tooth arrangement of the block 40 may be established or disestablished. In this arrangement the movement of the lever 52 or of the guide pin 54 within the elongated holes 56 is caused by the axial movement of a spindle nut 62 along a spindle 64 that may be driven by way of the motor/gear mechanism units 32 and 34. By means of the locking arrangement 31 an angle that has been set by the drive arrangement 7 may reproducibly be held, wherein the accuracy of the angle depends on the tooth pitch of the toothed surfaces 46 and 50.

Figure 4:
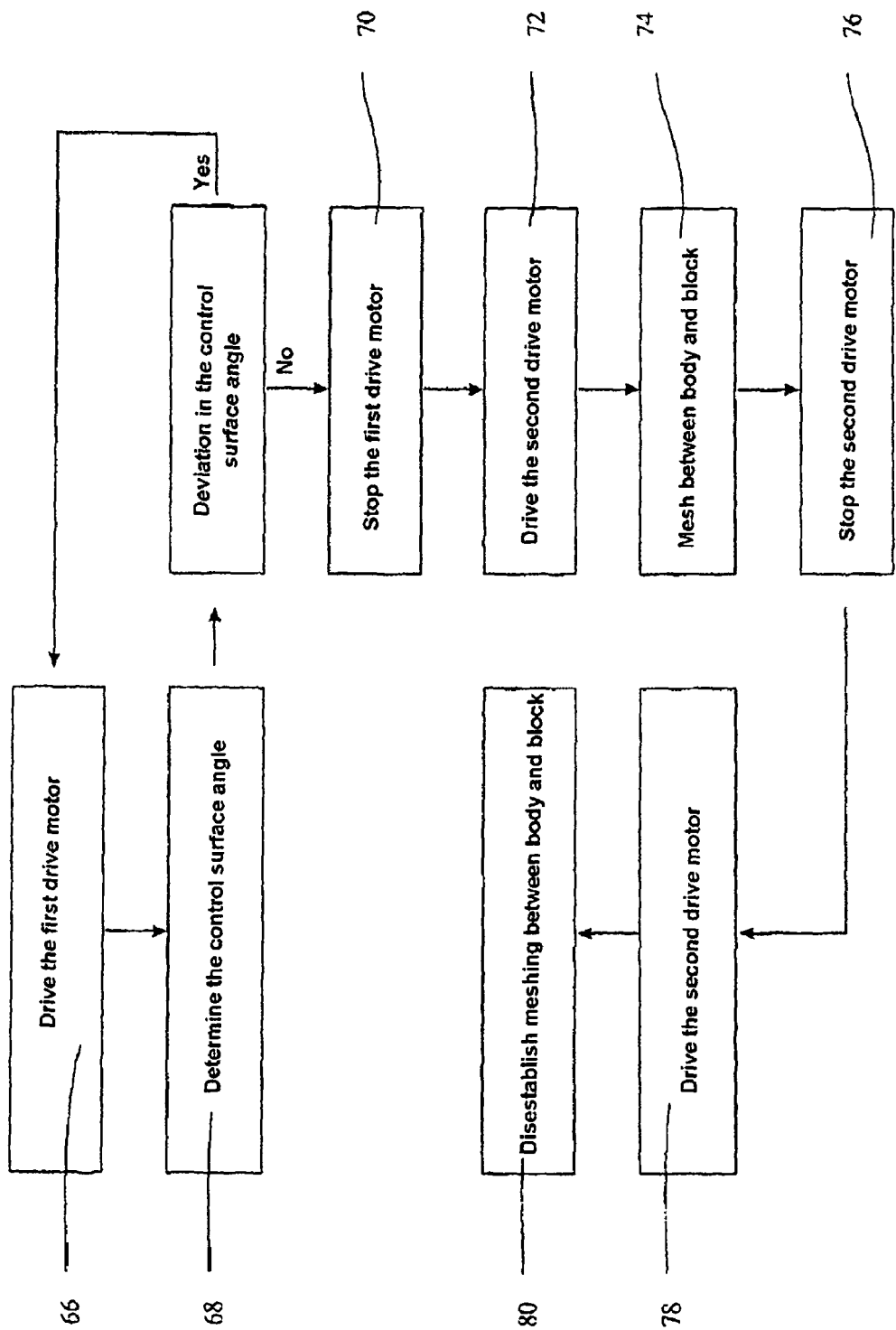
FIG. 4: a diagrammatic view of the method according to the invention.

A diagrammatic view of FIG. 4 sums up the process-related steps by means of which the system according to the invention may be operated. For adjusting and locking the control surface 2 that is movably arranged on a wind-tunnel aircraft model essentially the following steps are carried out:

driving 66 the first drive motor 10, arranged in a fixed manner relative to the control surface 2, which drive motor 10 is eccentrically connected to at least one first connecting rod 18 which moves one end 20 of the lever 22, the other end 24 of which lever 22 is held at a fixed point of the aircraft model;

determining 68 the control surface angle;

when a predetermined desired angle has been reached, i.e. when there is essentially no deviation from the desired angle, stopping 70 the first drive motor 10, driving 72 the second drive motor 32 that makes a deflection movement of the body 38 with a toothed surface 50 on the block 40 with the corresponding toothed surface 46 and in this process establishes a positive lock by meshing 74 the body 38 with the block 40, and stopping 76 the second drive motor 32;

in order to change the set and fixed control surface angle, to disestablish 80 the meshing of the teeth between the body 38 and the block 40, the second drive motor 32 is driven 78 in the opposite direction, or by way of a gear mechanism arranged downstream provides a reverse direction of rotation.

In the above arrangement it must be considered that determining the control surface angle should not be considered to be an individual and isolated step of the method, but instead, that the control surface angle is preferably determined continuously (online).

The system according to the invention thus provides a mechanically simple solution for the remotely-controlled deflection of a control surface 2 and its locking relative to an aircraft model. It is no longer necessary for a person to enter the wind tunnel and to manually reconfigure the control surfaces of the wind tunnel model. The system according to the invention is not limited to the use, described in the exemplary embodiment, for causing a deflection of a control surface 2 on a wing 4. Instead, the system, according to the invention may be used for adjusting any desired control surface of an aircraft model, of a control surface of an aircraft or generally of control surfaces of a vehicle, or of a device comprising control surfaces. Preferably, for convenient use of the system according to the invention a closed-loop automatic control unit is used which acquires the control surface angle of the control surface 2, compares it with a previously input desired value, and drives the first drive motor and the second drive motor.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. A system for adjusting and locking a control surface that is movably arranged on a wind-tunnel aircraft model, the system comprising:
a drive arrangement for driving the control surface, and a locking arrangement,
wherein the drive arrangement comprises a first drive motor arrangeable in a fixed manner relative to the control surface, at least one first connecting rod eccentrically connectable to the first drive motor, and at least one lever with one end that can be held on the first connecting rod and another end that can be held on a fixed point of the aircraft model in a pivotable manner; and
wherein the locking arrangement is attachable in a fixed manner relative to the control surface and is adapted to block a relative movement between the control surface and the aircraft model wherein the control surface, the first connecting rod, the lever and a fixed point of the aircraft model form a four-link chain.

2. The system of claim 1, further comprising an inclinometer for determining the angle of the control surface.

3. The system of claim 1, wherein the locking arrangement further comprises a block that is attachable at a fixed point of the aircraft model and comprises a toothed surface that faces the control surface, in which system the locking arrangement comprises a body that can be slidably held in a housing on the control surface, and on a surface that faces the block comprises a tooth arrangement that corresponds to the tooth arrangement of the block.

4. The system of claim 3, wherein the body is adapted to make a deflection movement in the housing in order to establish or disestablish a positive lock with the block by a second drive motor.

5. The system of claim 1, wherein the first connecting rod is connected to the first drive motor by way of a pair of toothed wheels.

6. The system of claim 1, wherein the first drive motor is connected to a gear mechanism.

7. The system of claim 1, wherein the second drive motor is connected to a gear mechanism.

8. The system of claim 1, further two first connecting rods and two second connecting rods.

9. The system of claim 1, wherein the system is adapted to be completely installed in the control surface to be adjusted.

10. The system of claim 1, wherein the system is remotely controllable.

11. The system of claim 1, further comprising a closed-loop control device for controlling the first drive motor and the second drive motor and for acquiring and evaluating the control surface angle.

12. A method for adjusting and locking a control surface that is movably arranged on a wind-tunnel aircraft model, the method comprising:
driving a first drive motor, arranged in a fixed manner relative to the control surface, which drive motor is eccentrically connected to at least one first connecting rod which moves one end of a lever, the other end of which lever is held at a fixed point of the aircraft model;
determining the control surface angle; and
when a predetermined desired angle has been reached, stopping the first drive motor, driving a second drive motor that makes a deflection movement of the body with a toothed surface on a block with a corresponding toothed surface and in this process establishes a positive lock by meshing the body with the block, and stopping the second drive motor wherein the control surface, the first connecting rod, the lever and a fixed point of the aircraft model form a four-link chain.

13. The method of claim 12, wherein in order to disestablish the positive lock between the body and the block, the second drive motor is driven in the opposite direction, or by way of a gear mechanism arranged downstream provides a reverse direction of rotation when the control surface angle is to be changed.

14. A wind-tunnel aircraft model comprising a system for adjusting and locking a control surface that is movably arranged on a wind-tunnel aircraft model, the system comprising:
a drive arrangement for driving the control surface, and a locking arrangement,
wherein the drive arrangement comprises a first drive motor arrangeable in a fixed manner relative to the control surface, at least one first connecting rod eccentrically connectable to the first drive motor, and at least one lever with one end that can be held on the first connecting rod and another end that can be held on a fixed point of the aircraft model in a pivotable manner; and
wherein the locking arrangement is attachable in a fixed manner relative to the control surface and is adapted to block a relative movement between the control surface and the aircraft model wherein the control surface, the first connecting rod, the lever and a fixed point of the aircraft model form a four-link chain.

15. An aircraft comprising a system for adjusting and locking a control surface that is movably arranged on a wind-tunnel aircraft model, the system comprising:
a drive arrangement for driving the control surface, and a locking arrangement,
wherein the drive arrangement comprises a first drive motor arrangeable in a fixed manner relative to the control surface, at least one first connecting rod eccentrically connectable to the first drive motor, and at least one lever with one end that can be held on the first connecting rod and another end that can be held on a fixed point of the aircraft model in a pivotable manner; and wherein the locking arrangement is attachable in a fixed manner relative to the control surface and is adapted to block a relative movement between the control surface and the aircraft model wherein the control surface, the first connecting rod, the lever and a fixed point of the aircraft model form a four-link chain.

* * * * *

UNITED STATES PATENT AND TRADEMARK OFFICE
CERTIFICATE OF CORRECTION

PATENT NO. : 8,136,768 B2  
APPLICATION NO. : 12/319470  
DATED : March 20, 2012  
INVENTOR(S) : Eldert Akkermann et al.

Page 1 of 1

It is certified that error appears in the above-identified patent and that said Letters Patent is hereby corrected as shown below:

In the Claims

Col. 6, Line 5, insert --comprising-- before "two first connecting rods".

Signed and Sealed this  
Twenty-sixth Day of January, 2016

Michelle K. Lee  
*Director of the United States Patent and Trademark Office*